July 11, 1961   H. D. FOGLE ET AL   2,991,551
METHOD AND APPARATUS FOR FORMING HOLES IN PIPES
Filed Nov. 17, 1958   2 Sheets-Sheet 1

INVENTORS.
Herbert D. Fogle.
BY Arthur F. Cox.
Dudley Bowman.
Wood, Herron & Evans.
ATTORNEYS.

July 11, 1961    H. D. FOGLE ET AL    2,991,551
METHOD AND APPARATUS FOR FORMING HOLES IN PIPES
Filed Nov. 17, 1958    2 Sheets-Sheet 2

INVENTORS.
Herbert D. Fogle.
BY Arthur F. Cox.
Dudley Bowman.
Wood, Herron & Evans,
ATTORNEYS.

United States Patent Office 2,991,551
Patented July 11, 1961

2,991,551
METHOD AND APPARATUS FOR FORMING HOLES IN PIPES
Herbert D. Fogle, Arthur F. Cox, and Dudley Bowman, Lebanon, Ohio, assignors to The Production Plating Works, Inc., Lebanon, Ohio, a corporation of Ohio
Filed Nov. 17, 1958, Ser. No. 774,494
6 Claims. (Cl. 29—545)

This invention relates to a method and apparatus for piercing apertures in a metal section and for creating a peripheral boss or rim around the aperture. The invention is particularly directed to a method and apparatus for the formation of tap holes in metal pipes, such as manifold pipes for gas ranges, wherein the rimmed holes subsequently are tapped to receive the threaded nipples of gas burners. The rims project from the internal and external surfaces of the pipe wall and form a sleeve having a length substantially greater than the thickness of the pipe wall so as to increase the number of screw threads which are engaged by the threaded nipples.

One of the primary objects of the invention has been to provide a forming tool and method of operation, whereby the holes are formed in the pipe wall and the internal and external rims are formed by a swaging or extruding action during a single pass of a rapidly rotating tool through the metal wall of the pipe.

A further objective of the invention has been to provide a spinning tool which forms a clean, uniform internal rim within the pipe which is free of burrs, ragged edges and the like. Such irregularities set up turbulence in the flow stream and cause non-uniform distribution of the gas to the nipples, thus making the pipe unfit for its intended use.

An apparatus and method for swaging rimmed apertures of this character is disclosed in the prior patents to Winford L. Enghauser Nos. 1,813,152 and 1,906,953. According to these patents, a hole is first drilled in the pipe wall, then a blunt ended swaging tool, having a diameter greater than the blank hole, is fed through the hole while rotating at high speed so as to frictionally heat the metal surrounding the hole to a swaging temperature. During passage of the swaging tool, the heated metal is displaced both outwardly and inwardly to form the bosses or rims surrounding the hole. According to the prior patents, the method is carried out in a machine having two sets of rotating spindles, one set for the drills and the other set for the swaging tool. The pipe manifolds are mounted in a shiftable fixture so arranged that the pipe is first presented to the drills and then indexed to a second position to present the drilled holes to the swaging or spinning tools. This procedure has been highly successful and has been in successful use for many years.

The forming tool of the present invention utilizes generally the same principles; however, the blank holes and peripheral rims are formed during a single pass of the tool, thereby fabricating the manifolds at a more rapid and efficient rate. In one of the forms disclosed herein, the forming tool comprises a cylindrical tube having a tapered working end providing a cutting edge. The tool is advanced axially while rotating at high speed, such that the cutting edge frictionally heats the pipe wall to a plastic state and penetrates the metal, while the tapered portion displaces the metal outwardly to form the external boss or rim. As the working end passes through the internal surface of the pipe, it displaces the metal inwardly to form the internal rim and finally severs the wall section in the form of a core or slug which drops into the pipe. The slug is delineated by the internal bore of the tubular tool; hence, the slug remains solid while its periphery is heated to a flowable state to permit the slug to be separated. After the slug is separated, the tool is advanced until its cylindrical shank passes through the internal rim so as to form the blank hole to a uniform diameter. The internal and external bosses or rims form a sleeve having a length which is approximately twice the thickness of the pipe wall so as to increase the number of screw threads which engage the nipples and provide a strong, leak-proof connection between the manifold and gas nipples.

It has been found that the tubular tool, by virtue of its slug-forming action, produces internal rims which are uniform in shape and which are substantially free of burrs and ragged edges which interfere with the flow stream. Apparently, the turning force of the spinning tool causes rotation of the slug as it is severed, thereby finishing the edge of the rim to a uniform length and removing any burrs which tend to form.

Another feature of the invention resides in an improved arrangement wherein the spinning tool is precisely guided in axial alignment with the pipe wall. For this purpose, there is provided a work-holding fixture for clamping the pipe, the fixture having an anti-friction bearing which slidably journals the chuck in which the spinning tool is mounted. This arrangement permits the use of a relatively short spinning tool for maximum rigidity since there is no guide structure intervening between the chuck and the work.

According to a modified aspect of the invention, the swaging tool is provided with a piercing or drilling nib at its outer end joined by a cylindrical swaging tool having a greater diameter than the nib, such that the drill first pierces the pipe wall by a drilling action, then the swaging tool forms the peripheral rims. According to this aspect of the invention, the piercing tool rotating at high speed without coolant or lubricant, pierces the wall and frictionally heats a localized area surrounding the hole. Immediately thereafter, the swaging portion of the tool, rotating at the same speed, raises the temperature of the metal sufficiently to reduce it to a flowable state and displaces or swages the metal to form the internal and external rims. Since the modified tool creates a drilling action, the metal is removed in the form of cuttings instead of the slug noted above. The drilling and forming tool is intended for operation wherein the metal pipe is of a type not readily pierced by the tubular friction type tool.

In both forms of the invention, the piercing and swaging operations are executed in a single pass of the tool; accordingly, the rimmed apertures are formed approximately in one-half the time required in the two-step operation disclosed in the aforesaid patents.

The various features and advantages of the present invention are more fully disclosed in the following description taken in conjunction with the attached drawings.

Machine and work fixture

Figure 1:
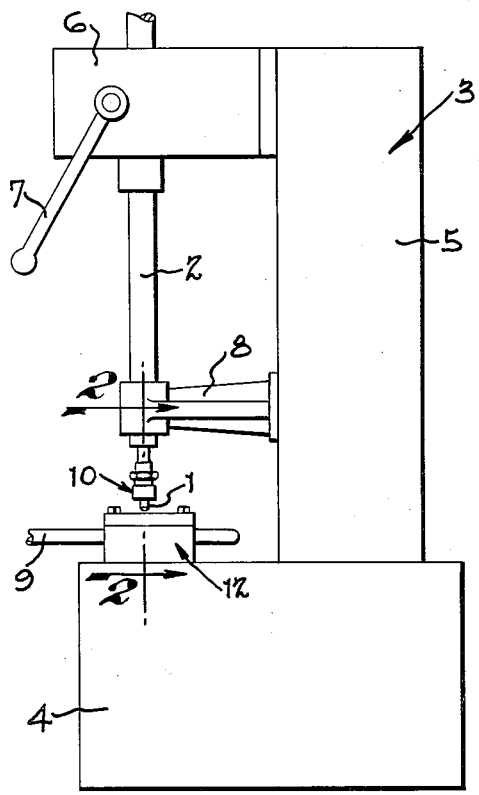
FIGURE 1 is a general side elevation of a drill press showing the spinning or swaging tool utilized in forming the rimmed tap holes in a manifold pipe.

According to the example shown in FIGURE 1, the swaging or spinning tool 1 is shown in the spindle 2 of the machine tool 3, which may represent a drill press having a base 4 and a column 5 including an overhanging drill head 6. The vertical spindle 2 projects through the drill head and is fed axially by a hand lever 7. The spindle is rotated by a driving system in the drill head (not shown) and the lower end of the spindle may be slidably journalled in a guide bracket 8 secured to column 5.

Figure 2:
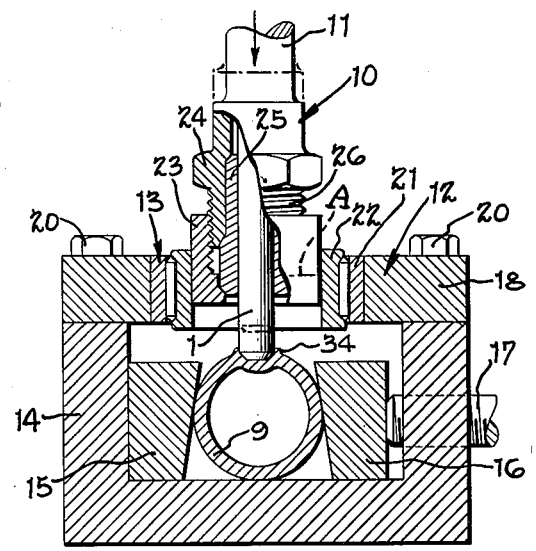
FIGURE 2 is an enlarged sectional view taken along line 2—2 of FIGURE 1, detailing the work fixture and showing the action of the spinning tool as it penetrates the wall of the pipe.

As shown in FIGURE 2, the spinning tool 1 is mounted in a drill chuck 10 having a tapered shank 11 which interfits a socket formed in the lower end of spindle 2 in the usual way. The chuck 10 passes into a work holding fixture indicated generally at 12, which is carried on base 4 of the machine tool. The fixture 12 holds a length of manifold pipe 9 firmly in position and guides the chuck 10 and its tool 1 for axial motion with respect to the pipe.

According to the structure shown in FIGURE 2, the chuck 10 is centered and guided axially by a needle bearing 13 carried by the fixture 12. During its working stroke, the rotating chuck moves axially relative to the needle bearing from the retracted position, indicated at A in broken lines (FIGURE 2) to the fully extended position, shown in FIGURE 3. In order to replace or reset the spinning tool relative to the chuck, the spindle may be retracted beyond the normal limit so as to withdraw the chuck from the needle bearing as shown in FIGURE 1. In the retracted non-working position, the chuck is accessible for replacement or readjustment of the tool as explained later. The spindle 2 preferably is provided with stop means engageable at the normal working limits of the tool, but which may be disengaged to permit withdrawal of the chuck as shown in FIGURE 1.

The fixture 12 comprises a channel shaped block 14 having a fixed jaw 15 and a movable jaw 16 which is shifted by a screw 17 to engage and disengage the work. The block 14 is secured to the base 4 of the machine tool by suitable means (not shown). The pipe to be acted upon is inserted endwisely into the fixture with the clamping jaw 16 unclamped and with the chuck and spinning tool in the retracted position, previously indicated in broken lines. Upon engagement of the clamping jaw 16, the pipe is held firmly in alignment with the axis of the forming tool. Thereafter, the hand lever 6 is actuated to advance the tool, as shown in FIGURE 3.

The needle bearing 13 is carried in a plate 18 which spans the channel shaped block 14, and is rigidly secured by the bolts 20. The needle bearing is conventional, its outer race 21 being pressed or otherwise secured in a bore formed in plate 18. The inner race 22 snugly interfits the cylindrical collar 23 of the chuck 10. Thus, the collar 23 slides axially through the inner race 22 and is precisely guided by the needle bearing in axial alignment with the surface of the work during the hole-forming stroke.

The chuck 10 may represent a conventional structure suitable for mounting drills and similar tools. In the form illustrated in FIGURE 2, the chuck includes a body 24 having a tapered internal bore or socket, and having external screw threads 26. A compressible collet or clamping member 25 interfits the bore of chuck body, and the lower end of the collet is engaged by a shoulder formed at the lower end of cylindrical collar 23. Collar 23 is engaged upon the threaded outside diameter 26 of the chuck such that rotation of collar 23 relative to the threaded portion of the chuck body forces the collet endwisely into the tapered bore, thus compressing the collet into clamping engagement with the spinning tool.

Figure 3:
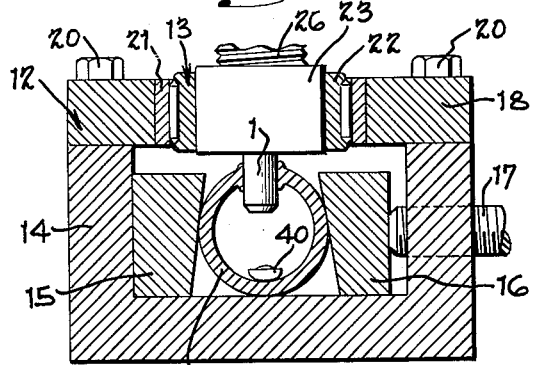
FIGURE 3 is a view similar to FIGURE 2, showing the tool at the end of its working stroke with the swaged aperture formed in the pipe wall.

It will be understood that the guided chuck arrangement of FIGURES 2 and 3 permits the use of a short forming tool since the working end of the tool, which projects from the chuck, passes directly through the pipe wall without any intervening guide structure. After prolonged service, the cutting end of the spinning tool may become worn and require resharpening. Preferably, the spinning tool is sharpened at both ends, allowing the operator to disengage the tool from the chuck, turn it end-for-end and replace it in the chuck with the unused end in working position. After both ends have been worn, the spinning tool is removed and both ends may be sharpened for reuse.

Figure 6:
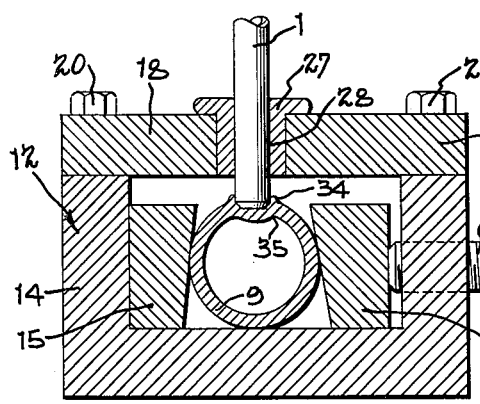
FIGURE 6 is a view similar to FIGURE 2, showing a modified work fixture in which the spinning tool is guided by a drill bushing as distinguished from the chuck guide of FIGURE 2.

According to the modified fixture shown in FIGURE 6, the forming tool 1 is guided by a drill bushing 27, as distinguished from the guided chuck arrangement shown in FIGURE 2. In this instance, a chuck similar to chuck 10, is mounted on the spindle and resides above the drill bushing. Bushing 27 is pressed or otherwise fitted in a bore formed in plate 18 and its inside diameter 28 provides a running fit with the forming tool 1 according to standard drill jig practice. The bushing provides the same advantages as the guided chuck structure shown in FIGURE 2. However, the modified bushing arrangement requires a longer forming tool to accommodate the length of the drill bushing.

The drill press shown in FIGURE 1 has been selected to illustrate one machine for carrying out the principles of the invention. It will be understood that the spinning or swaging tool is intended for rapid production operations and may be mounted in any one of several different types of multiple spindle machines arranged to form the entire set of rimmed openings during each cycle of operation. It will be understood that in production operations of this type, pipe fixtures, similar to fixture 12, are provided with multiple needle bearings or drill bushing, one for each spindle of the machine.

Tubular swaging tool

Figure 7:
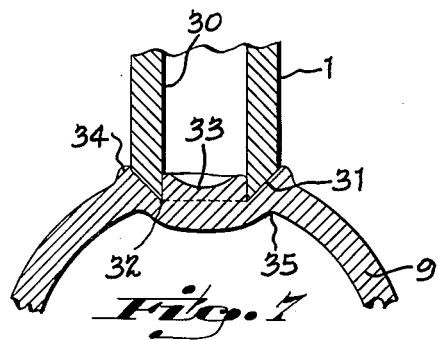
FIGURE 7 is an enlarged fragmentary sectional view of the spinning tool and pipe taken from FIGURE 2, detailing the swaging action of the tool as it passes through the pipe wall.
Figure 8:
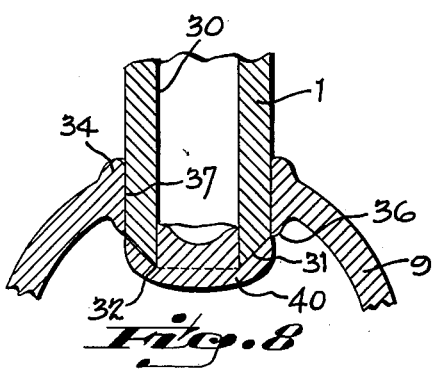
FIGURE 8 is a view similar to FIGURE 7, showing the final stage in the swaging operation.

As detailed in FIGURES 7 and 8, the swaging tool 1 and its working end is tapered as at 31 to provide, in combination with bore 30, a cylindrical cutting edge 32. The outside diameter of the cylindrical tool, above the tapered end, determines the diameter of the hole which is formed in the pipe wall. In order to pierce the pipe 9, the tool is rotated at a high speed and is fed axially (by operation of hand lever 7) so as to present the cutting edge 32 to the surface of the pipe. As the cutting edge contacts the pipe, it heats the pipe wall by friction to a sufficiently high temperature to reduce the localized area about the cutting edge to a plastic state. As the axial feed motion continues, the cutting edge 32 begins to penetrate the pipe wall (FIGURE 7), while the bore 30 of the tool delineates a central core 33, which is later excised from the pipe wall. As the tapered end penetrates the pipe wall, it upsets the heated metal surrounding the tool and progressively forces it outwardly to swage the peripheral rim 34 on the outside diameter of the pipe.

Figures 4, 5:
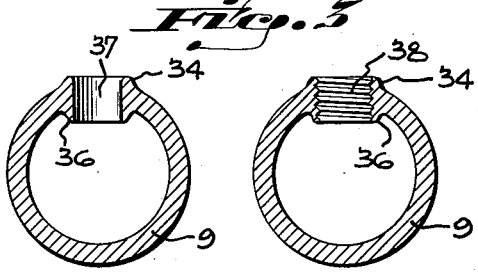
FIGURE 4 is an enlarged sectional view showing the swaged aperture in the pipe corresponding to FIGURE 3.
FIGURE 5 is a view similar to FIGURE 4, showing the swaged aperture after the tapping operation.

While the external rim 34 is being swaged, the cutting edge 32 progressively depresses the core 33 and the surrounding portion of the pipe wall, as indicated at 35 in FIGURE 7. During continued feed motion of the spinning tool, the plastic metal 35 is swaged downwardly by the tapered end of the tool, thus progressively forming the internal rim 36 (FIGURE 8) and finally separating the core 33 from the pipe wall. Thereafter, the cylindrical body of the tool above the tapered end passes through the internal rim 36 to complete the aperture 37. As the core 33 is separated from the edge of the internal rim, it drops downwardly in the form of a slug 40, as shown in FIGURE 3. The several slugs remain inside the pipe and are discharged with the chips formed during the tapping operation. The diameter of the aperture 37 provides the tap hole for a given size screw thread when the manifold is tapped as at 38 (FIGURE 5).

It will be understood that the tubular tool quickly raises the metal surrounding the hole to a plastic temperature while the core 33, which is being excised from the wall, remains at a lower temperature and substantially in a non-plastic state. This overcomes the tendency to deform the pipe wall except in the localized area of the hole which subsequently forms the inner and outer bosses or rims. Due to its frictional action, the tapered end of the tool tends to rotate the core as it is about to be separated from the pipe wall. This rotary motion creates a relative spinning action which finishes off the edge of the internal rim 36 and prevents the formation of burrs, ragged edges or other irregularities.

In actual practice, the forming tool penetrates the pipe wall with little resistance, since the speed of tool rotation causes the tool to melt its way rapidly through the wall. In practicing the invention, it has been found that the operation is best carried out at a tool speed in the neighborhood of 2700 r.p.m. This speed may be increased or decreased in accordance with variable factors such as tool diameter and the quality of the metal being swaged. During the forming operation, the pipe wall in the immediate area of the tool shows a cherry-red glow, indicating a temperature between 1500° F. and 1600° F. which provides the most efficient operating temperature.

The axial rate of tool feed preferably is governed by and depends upon the rate of penetration of the tool. For this reason, a manual feed, such as by hand lever 7, or if the machine is automatic, a pneumatic feed is preferred to a positive feed mechanism.

*Modified forming tools*

Figure 9:
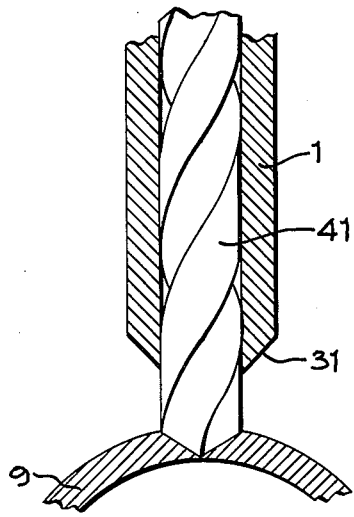
FIGURE 9 is an enlarged fragmentary sectional view showing a swaging tool of modified design, utilizing a drill to pierce the work.
Figure 10:
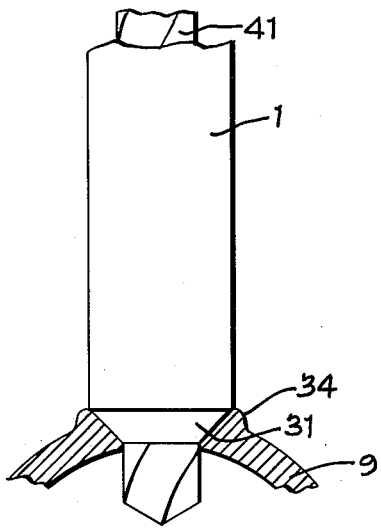
FIGURE 10 is a view similar to FIGURE 9, showing the swaging action of the modified tool.

The forming tool shown in FIGURES 9 and 10 consists of a tubular tool similar to the tool 1, described above, but having a twist drill 41 projecting from its working end. The drill is conventional and is arranged to create a cutting action in forming the hole, while the tube 1 forms the rims. As shown in FIGURE 10, the tapered end 31 of the tool blends with the drill and forms a shoulder which creates the swaging action described above. The drill 41 may be press-fitted within the tubular swaging tool 1 or it may be clamped in position by suitable means (not shown).

The tool is fed into the work without lubrication or coolant, consequently as the drill penetrates the pipe wall (FIGURE 9), it preheats the metal surrounding the hole by reason of frictional resistance. After the drill penetrates the pipe wall, the tapered end 31 of the swaging tool frictionally engages the preheated margin of the drilled hole and quickly raises the metal to a flowable temperature. As the tapered end 31 passes through the pipe wall, it swages the inner and outer rims in substantially the same manner as described with reference to FIGURES 7 and 8. The modified tool is intended particularly for forming apertures in metals which are difficult to swage such as alloys of the type which are not readily reduced to a flowable state.

Figure 11:
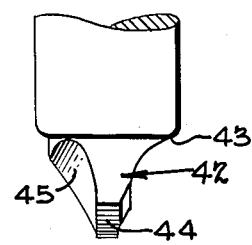
FIGURE 11 is an enlarged fragmentary view showing another modification in which the hole is drilled and swaged, similar to the structure of FIGURE 9.
Figure 12:
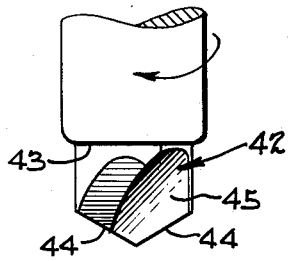
FIGURE 12 is a side elevation of the modified tool as projected from FIGURE 11.
Figure 13:
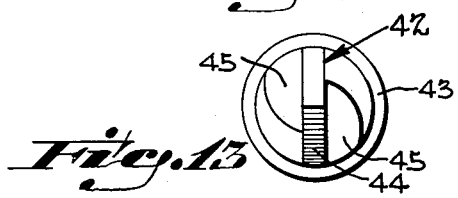
FIGURE 13 is a bottom plan view of the tool as projected from FIGURE 11.

The modified tool shown in FIGURES 11-13 also comprises a cutting end 42 leading to a swaging shoulder 43. In this case, the tool is of one-piece construction. As best shown in FIGURE 13, the cutting end 42 is in the form of a substantially flat bit extending diametrically across the end of the tool and having a central point delineated by the tapered cutting edges 44—44. Each cutting edge has a working face which blends into an outwardly curved flute 45. The drill is rotated in the cutting direction indicated in FIGURE 12, such that the curved flutes are inclined outwardly relative to the longitudinal axis of the tool to discharge the cuttings as the tool penetrates the pipe wall. During the working stroke, the cutting end pierces and preheats the pipe wall, as outlined with respect to FIGURES 9 and 10, then the shoulder 43 frictionally heats the metal to a swaging temperature and forms the inner and outer rims.

Having described our invention, we claim:

1. The method of forming a hole in the wall of a metal pipe and of swaging internal and external peripheral rims during a single operation, said method comprising the steps of forcing the tapered end portion of a tubular swaging tool axially against the blank, unheated wall of the pipe while rotating the tool at a sufficient speed to reduce the wall to a plastic state in the localized area of said tapered portion, advancing the tapered portion of the rotating tool through said metal wall while concurrently displacing said localized plastic metal upwardly along said tapered portion to form an external rim rising from said wall while the bore of said tool forms and removes a central core, continuing the advancement of the rotating tapered portion of the tool through said wall to form a hole while said tapered portion depresses the plastic metal inwardly to form an internal rim about the hole, and finally advancing a cylindrical shank portion of said rotating tool through the hole to reduce the same to a uniform diameter.

2. The method of forming a hole in the wall of a metal pipe and of swaging internal and external peripheral rims during a single operation, said method comprising the steps of forcing the tapered end portion of a tubular swaging tool axially against the blank, unheated wall of the pipe while rotating the tool at a sufficient speed to reduce the wall to a plastic state in the localized area of said tapered portion, advancing the tapered portion of the rotating tool through said metal wall while concurrently displacing said plastic metal upwardly along the tapered portion to form an external rim rising from said wall while the bore of said tool delineates a central core which is maintained substantially in a non-plastic state, continuing the advancement of the rotating tool while said tapered portion depresses the plastic metal inwardly to form an internal rim while concurrently separating said central core from the depressed internal rim, and finally advancing a cylindrical shank portion of said rotating tool through the wall to form a hole having a uniform diameter.

3. A piercing and swaging tool adapted to form a hole in the unheated metal wall of a pipe and to swage a peripheral rim at opposite ends of said hole during a single pass of the tool, said tool comprising a cylindrical body having a bore extending axially therethrough, said tool having a working end comprising a tapered portion which converges downwardly from the cylindrical body of said tool, said tapered portion intercepting the said internal bore and thereby providing a cutting edge at the working end of said tool, said tool adapted to be rotated and advanced axially through the metal wall, whereby said rotating cutting edge frictionally heats said wall to a temperature sufficiently high to reduce the metal wall to a plastic state and progressively penetrates said wall while the tapered portion of the tool swages the plastic metal and forms rims surrounding said hole at opposite ends thereof.

4. A piercing and swaging tool adapted to form a hole in the unheated metal wall of a pipe and to swage a peripheral rim at opposite ends of said hole during a single pass of the tool, said tool comprising a cylindrical body having a bore extending axially therethrough, said tool having a swaging end comprising a tapered portion which converges downwardly from the cylindrical body of said tool, the outer end of the tapered portion intercepting the said internal bore and thereby delineating an annular working face having a restricted width and having a diameter substantially smaller than said cylindrical body, said tool adapted to be rotated and advanced axially through the unheated wall of the pipe, whereby said rotating working face frictionally heats said wall to a temperature sufficiently high to reduce the metal wall to a plastic state and progressively penetrates said wall while the tapered portion of the tool swages the flowable metal outwardly in opposite directions relative to the tool axis and forms rims surrounding said hole at opposite ends thereof.

5. A machine for piercing a hole in an unheated metal pipe wall and swaging a peripheral rim at opposite ends of said hole during a single operation, said machine comprising a base, a rotatable spindle adapted to be fed axially relative to said base, a swaging tool projecting outwardly from said spindle, a pipe clamping fixture mounted on said base including means for clamping a length of pipe in position to be engaged by the swaging tool, guide means on said fixture for guiding the swaging tool axially relative to said fixture, said swaging tool having a piercing portion at the outer end thereof and having a cylindrical shank above the piercing portion, said shank having a greater diameter than said piercing portion, said guide means of the fixture adapted to guide the swaging tool axially relative to a length of pipe clamped in said fixture, said spindle adapted to advance the piercing portion of the swaging tool into frictional contact with the unheated pipe wall and to rotate the tool at sufficient speed to heat the wall to a plastic state, whereby the piercing portion of the tool forms a hole in the pipe wall while the cylindrical shank displaces the plastic metal in both directions to form peripheral rims at opposite ends of the hole during a single pass of the tool.

6. A machine for piercing a hole in an unheated metal pipe wall and swaging a peripheral rim at opposite ends of said hole during a single operation, said machine comprising a base, a rotatable spindle adapted to be fed axially relative to said base, a cylindrical chuck mounted at the end of said spindle, a swaging tool projecting outwardly from said chuck, a pipe clamping fixture mounted on said base including means for clamping a length of pipe in position to be engaged by the swaging tool, an anti-friction bearing mounted on said fixture beneath the spindle, said cylindrical chuck being slidably confined in said anti-friction bearing, whereby said chuck and swaging tool are guided for axial motion relative to said fixture, said swaging tool having a piercing portion at the outer end thereof and having a cylindrical shank above the piercing portion, said shank having a greater diameter than said piercing portion, said anti-friction bearing of the fixture adapted to guide the swaging tool axially relative to a length of pipe clamped in said fixture, said spindle adapted to advance the piercing portion of the swaging tool into frictional engagement with the unheated pipe wall and to rotate the tool at sufficient speed to heat the wall to a plastic state, whereby the piercing portion of the tool forms a hole in the pipe wall while the cylindrical shank displaces the plastic metal in both directions to form peripheral rims at opposite ends of the hole during a single pass of the tool.

References Cited in the file of this patent
UNITED STATES PATENTS

| | | |
|---|---|---|
| 1,906,953 | Enghauser | May 2, 1933 |
| 2,273,931 | Byrnes | Feb. 24, 1942 |
| 2,312,176 | Kotowski | Feb. 23, 1943 |
| 2,632,511 | Hamilton | Mar. 24, 1953 |
| 2,795,039 | Hutchins | June 11, 1957 |